(12) United States Patent
Meredith et al.

(10) Patent No.: US 10,187,780 B2
(45) Date of Patent: *Jan. 22, 2019

(54) FACILITATION OF MOBILE TECHNOLOGY MICROCELLULAR SERVICE

(71) Applicant: AT&T Intellectual Property I, L.P., Atlanta, GA (US)

(72) Inventors: Sheldon Meredith, Roswell, GA (US); John Francis, Atlanta, GA (US); William Cottrill, Canton, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/860,374

(22) Filed: Jan. 2, 2018

(65) Prior Publication Data

US 2018/0124591 A1    May 3, 2018

Related U.S. Application Data

(63) Continuation of application No. 15/266,142, filed on Sep. 15, 2016, now Pat. No. 9,883,373.

(51) Int. Cl.
*H04W 8/06* (2009.01)
*H04W 68/00* (2009.01)
(Continued)

(52) U.S. Cl.
CPC .............. *H04W 8/06* (2013.01); *H04W 4/02* (2013.01); *H04W 68/005* (2013.01); *H04W 8/14* (2013.01); *H04W 8/26* (2013.01); *H04W 88/06* (2013.01)

(58) Field of Classification Search
CPC ........... H04W 8/06; H04W 8/14; H04W 8/26; H04W 4/02; H04W 68/005; H04W 72/04; H04W 88/06
See application file for complete search history.

(56) References Cited

U.S. PATENT DOCUMENTS

| 6,714,797 B1 | 3/2004 | Rautila |
| 7,330,448 B2 * | 2/2008 | Verma ............... H04W 36/0011 370/331 |

(Continued)

FOREIGN PATENT DOCUMENTS

| AU | 2004307470 | 5/2005 |
| CN | 103607780 | 2/2014 |

(Continued)

OTHER PUBLICATIONS

Chandrasekhar, et al. "Femtocell networks: a survey." IEEE Communications magazine 46.9 (2008): pp. 59-67.

(Continued)

*Primary Examiner* — Wayne H Cai
(74) *Attorney, Agent, or Firm* — Amin, Turocy & Watson, LLP

(57) ABSTRACT

A mobile device can be configured to connect to a telecommunications network via a wireless fidelity network device. The mobile device can register with a channel of a base station, which can indicate where the mobile device is located in relation to the base station. Additionally, the mobile device can communicate with other mobile devices via the wireless fidelity network device. In response to an indication that the mobile device is no longer connected to the wireless fidelity network device, notifications can be sent to the mobile device or other mobile devices regarding additional communication.

20 Claims, 12 Drawing Sheets

(51) Int. Cl.
*H04W 4/02* (2018.01)
*H04W 8/26* (2009.01)
*H04W 8/14* (2009.01)
*H04W 88/06* (2009.01)

(56) References Cited

U.S. PATENT DOCUMENTS

| | | | |
|---|---|---|---|
| 7,814,483 | B2 | 10/2010 | Li et al. |
| 8,023,966 | B2 | 9/2011 | Aaltonen |
| 8,593,952 | B2 | 11/2013 | Puthenpura et al. |
| 8,817,623 | B2 | 8/2014 | Gupta et al. |
| 9,001,787 | B1 | 4/2015 | Conant et al. |
| 9,042,266 | B2 | 5/2015 | Livingston |
| 9,097,537 | B2 * | 8/2015 | Chun ................. G01C 21/206 |
| 9,258,833 | B2 | 2/2016 | Bitran et al. |
| 9,264,554 | B2 | 2/2016 | Anderson et al. |
| 9,363,391 | B2 | 6/2016 | Burcham et al. |
| 2005/0128995 | A1 | 6/2005 | Ott et al. |
| 2005/0181776 | A1 | 8/2005 | Verma et al. |
| 2009/0170519 | A1 * | 7/2009 | Wilhoite ............ H04M 3/42246 455/436 |
| 2009/0320077 | A1 | 12/2009 | Gazdzinski |
| 2013/0225134 | A1 * | 8/2013 | Earnshaw ............ H04M 3/533 455/413 |
| 2014/0177530 | A1 | 6/2014 | Zhao et al. |
| 2014/0213219 | A1 | 7/2014 | Mohebbi |
| 2014/0213256 | A1 * | 7/2014 | Meylan ................ H04W 48/18 455/436 |
| 2014/0247807 | A1 | 9/2014 | Westerberg et al. |
| 2014/0295807 | A1 * | 10/2014 | Li ......................... H04W 4/16 455/414.1 |
| 2015/0117409 | A1 | 4/2015 | Ghai |
| 2015/0271323 | A1 | 9/2015 | Kim et al. |
| 2015/0296440 | A1 | 10/2015 | Forssell et al. |
| 2015/0350871 | A1 | 12/2015 | Gupta et al. |
| 2016/0105883 | A1 | 4/2016 | Ghai |
| 2016/0212666 | A1 | 7/2016 | Zalzalah et al. |
| 2016/0234711 | A1 | 8/2016 | Wang et al. |

FOREIGN PATENT DOCUMENTS

| | | |
|---|---|---|
| DE | 102015202058 | 8/2015 |
| EP | 2617250 | 7/2013 |
| EP | 2959725 | 12/2015 |
| WO | 2015127241 | 8/2015 |
| WO | 2015184418 | 12/2015 |
| WO | 2016046745 | 3/2016 |

OTHER PUBLICATIONS

Majlesi, et al. An adaptive fuzzy logic based handoff algorithm

Majlesi, Amir, and Babak H. Khalaj. "An adaptive fuzzy logic based handoff algorithm for interworking between WLANs and mobile networks." Personal, Indoor and Mobile Radio Communications, 2002, The 13th IEEE International Symposium, vol. 5. IEEE, 2002.

Ghosh, et al. "An architecture for next-generation radio access networks." IEEE network 19.5 (2005): pp. 35-42.

Agrawal, et al. "SWAN: A mobile multimedia wireless network." IEEE Personal Communications 3.2 (1996): pp. 18-33.

Binti, et al. "Femtocell: A survey on development in LTE network." ITMAR, 2014, vol. 1, pp. 134-146.

Non-Final Office Action dated Apr. 18, 2017 for U.S. Appl. No. 15/266,142, 32 pages.

Final Office Action dated Jul. 19, 2017 for U.S. Appl. No. 15/266,142, 16 pages.

\* cited by examiner

FACILITATION OF MOBILE TECHNOLOGY MICROCELLULAR SERVICE

RELATED APPLICATION

This patent application is a continuation of and claims priority to U.S. patent application Ser. No. 15/266,142, filed Sep. 15, 2016, and entitled "FACILITATION OF MOBILE TECHNOLOGY MICROCELLULAR SERVICE," which application is hereby incorporated by reference herein in its entirety.

TECHNICAL FIELD

This disclosure relates generally to facilitating mobile technology microcellular service. More specifically, this disclosure relates to facilitating voice and data services over wireless fidelity devices.

BACKGROUND

Generic access network (GAN) telecommunications can allow cell phone packets to be forwarded to a network access point over the Internet. Connecting unlicensed mobile access (UMA)-compatible mobile phones to use wireless fidelity (Wi-Fi) can be used in place of conventional cell towers. This can be useful in locations with poor cell coverage where some other form of Internet access is available, especially at the home or office. The user can move from cell to Wi-Fi and back again with the same invisibility that the cell network offers when moving from tower to tower.

Since the GAN system works over the Internet, a UMA-capable device can connect to a service provider from any location with Internet access. This is particularly useful for travelers, who can connect to their provider's GANC and make calls into their home service area from any location.

The above-described background relating to a facilitating voice and data services over wireless fidelity devices is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
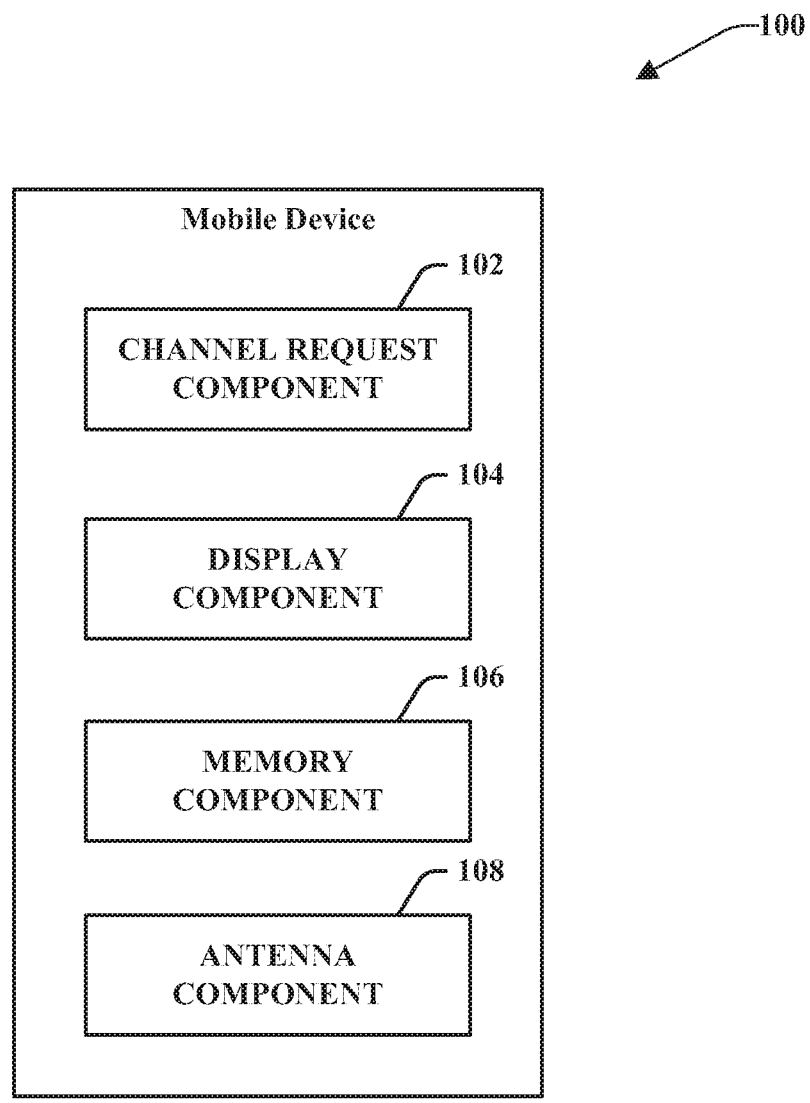
FIG. 1 illustrates an example mobile device for connecting to a microcellular network service according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate a seamless handoff of communication between mobile devices and network devices.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It is noted that although various aspects and embodiments are discussed herein with respect to Universal Mobile Telecommunications System (UMTS) and/or Long Term Evolution (LTE), the disclosed aspects are not limited to a UMTS implementation and/or an LTE implementation. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate microcellular service. Facilitating microcellular service can be implemented in connection with any type of device with a connection to the communications network such as: a mobile handset, a computer, a handheld device, or the like.

A mobile device is disclosed that can have minimal interaction with a wireless mobility radio and core networks. The mobile device can have the majority of its interaction over wireless fidelity (Wi-Fi) networks or other local wireless networks. Upon powering on, the mobile device can search for a mobile network. In response to the mobile device's search for a mobile network, the mobile device can receive a mobile network code transmitted from a radio of a base station device that could either be a standardized 3GPP radio type or another radio type. If another radio type, in order to maximize coverage, the mobile device can use frequencies lower than the 700 MHz band used for LTE. If a standard pilot channel is used from an existing base station, the mobile device can transmit a reverse channel registration request that can enable the device to be connected to the cellular network. The reverse channel registration can be a transmission link from the mobile device to a central hub (e.g. cellular network) to use a channel associated with the base station. The cellular network can then allow the mobile device to register to the channel associated with the cellular network for identification purposes.

Additionally, the cellular network can identify the mobile device as belonging to a station class type that is precluded from using the mobility network for any voice or data transactions. Rather, the registration process can be exclusively to tell the mobile network where the device is located. The location of the mobile device can be used by a visitor location register and/or a serving general packet radio service support node (SGSN) for the purpose of delivering paging or multimedia messaging service (MMS) messages to the mobile device. The mobile device can conduct all of its voice or data transactions over Wi-Fi or other local wireless technologies. Whenever the mobile device is connected to an open Wi-Fi connection, the mobile device can notify a location register in the mobile network, wherein the notification can comprise an Internet protocol (IP) address of the Wi-Fi device with which the mobile device is connected. Consequently, the Wi-Fi device can expose its IP address via the Internet service provider (ISP) so that the mobile device can know what the IP address is.

To the extent voice over IP (VoIP) or data originates from the mobile device, functionality of the mobile device can be similar to other mobile devices operating over Wi-Fi. However, when another device attempts to call or otherwise contact the mobile device, the mobile radio network knows the last Wi-Fi IP address where the mobile device was connected. The mobile radio network can attempt to contact the mobile device over the Wi-Fi network using the previous channel info instead of paging the mobile device on the mobility network (since the device is not communicating on the mobility network). If the mobile device is connected to the Wi-Fi device but does not respond, the mobile device can receive an indication of a missed call. However, if the mobile device is no longer connected, the call or data communication cannot reach the mobile device. In the case of a missed call, the mobile network can send a "missed call notification" over the paging channel of the mobile radio network with which the mobile device is registered. Even though the mobile device is not connected to Wi-Fi, the device can still receive the paging channel data and can know that a call was missed and/or that a message is waiting. Effectively, in one embodiment, the paging channel can submit restricted messages/data. Given sufficient availability of paging bandwidth, other small volume notifications such as text can be transmitted via the mobile radio network.

Although different types of radios can be used for paging from base stations, voice/data transmissions to the mobile device can remain the same. In an alternative embodiment, a broadband, low power, and/or low frequency radio can be used for this purpose. Because radio base station antennas are tuned, transmitting on a different frequency can have a negative consequence requiring bypassing existing duplexers, diplexers, and/or antennas.

Additionally, in response to transmitting missed call data and/or missed message data to the mobile device, the mobile device can acknowledge receipt of the transmission. The acknowledgment can also be performed over the reverse access channel. Consequently, whenever the mobile device is used at home, at work, and/or any location with usable Wi-Fi, the mobile device can behave the same as if it is on any mobility network (e.g. send and receive calls and data). The difference is that the mobile device essentially becomes substantially non-functional once it is no longer in communication with a Wi-Fi device until it communicates with the same or another Wi-Fi device at a later time. For example, when a user of the mobile device is in a location where there is no Wi-Fi available, the proposed mobile device can receive an indication of when someone is trying to make contact with the user and perhaps receive text data that could be important in an emergency. After receiving the notification (text data), the user can wait to look for a Wi-Fi device to connect to or take the mobile device to connect to a Wi-Fi device where the user can follow-up with the person who was trying to contact the user.

In yet another embodiment, the mobile device can transmit limited text data over the reverse paging channel, or other dedicated channel, in response to a calling party, to let the calling party know an estimated time before the user can make contact. The limited text data can be facilitated by several variations. For instance, the text data can be pre-populated and stored in the network. The text data can also be contingent upon a location of the mobile device. For instance, if the network knows that the mobile device is no longer connected to a specific Wi-Fi device, then the network can calculate the distance of the mobile device to the nearest Wi-Fi device and provide a response to the calling party indicating an estimated time that the mobile device will be capable of communicating with another Wi-Fi device in the mobile device's path. Additionally, the pre-populated text message can be related to specific individuals. For example, for a certain group of mobile numbers (family) that the user anticipates calls from, the pre-populated message can say, "I'll respond ASAP, love you", where a default message for numbers that the user has not identified can say, "Currently unavailable". It should be understood that voice message can be prepopulated and/or stored in substantially the same manner as a text message.

In essence, the disclosed mobile device can conduct its voice and data transactions over a Wi-Fi network by using the mobility network for registration, receiving pages, acknowledging pages, and sending small texts in response to pages. The aforementioned system can comprise a location center that constantly keeps track, or at least at regular intervals, of where/when the mobile device was last connected to a Wi-Fi device. Thus, if the mobile device is connected to the Wi-Fi device but does not answer a call, then an assumption can be made that the call was intentionally unanswered by the user and there is no reason to page the mobile device over the macro network, (since the mobile device has already received in indication of the incoming call). Alternatively, if the mobile device is not connected to a Wi-Fi device, the mobile device can receive a page over the macro network regarding the missed attempt at communication from a calling device. For purposes of this disclosure, it should be noted that a calling device can also be a texting device attempting to communicate with the mobile device. The base station device can use the mobile network location register (location area code (LAC) in the visitor location register (VLR) for mobile switches or a routing access controller (RAC) in the SGSN) to target a message to the mobile device over the paging channel. Although the user may not be able to immediately take or make a call, they will know that they have missed a call/data message and can connect to a Wi-Fi device to return the missed call/data message at their convenience. It should also be noted that a service provider agreement can dictate various communication and functionality between the mobile device and the Wi-Fi devices. For instance certain Wi-Fi devices can be predetermined as acceptable and/or only available during certain periods (hours, days, weeks, months, etc.) based on the service provider agreement of the mobile device and/or the Wi-Fi device.

In one embodiment, described herein is a method comprising transmitting, by a first network device comprising a processor, request data related to a registration request associated with a channel of a base station device. The first network device can connect to a second network device, resulting in a connection between the first network device and the second network device. The first network device can be a mobile device and the second network device can be a Wi-Fi device. Thereafter, the first network device can receive Internet protocol address data associated with an Internet protocol address of the second network device, and transmit the Internet protocol address data to a location register device.

According to another embodiment, a system can facilitate, receiving request data associated with a channel registration request from a first mobile device. In response to receiving the request data, the system can register the first mobile device to a base station device, and connect the first mobile device to a network device. Additionally, based on the connecting the mobile device to the network device, the system can receive Internet protocol address data associated with an Internet protocol address of the network device, and facilitating a transmission of a communication from a second mobile device to the first mobile device via the network device.

According to yet another embodiment, described herein is a machine-readable storage medium that can perform the operations comprising registering a first mobile device with a base station device, and based on a proximity of the mobile device to a network device, receiving internet protocol address data associated with an internet protocol address of the network device. Further the machine-readable storage medium can perform an additional operation comprising facilitating a transmission of communication data associated with a communication from a second mobile device to the first mobile device via the network device.

These and other embodiments or implementations are described in more detail below with reference to the drawings.

Referring now to FIG. 1, illustrated is an example mobile device 100 for connecting to a microcellular service in accordance with the embodiments herein. The mobile device 100 can comprise several components for facilitating a connection to microcellular services. It should be noted that the mobile device 100 can comprise, but is not limited to, a channel request component 102, a display component 104, a memory component 106, and/or an antenna component 108. The channel request component 102 can request access to a channel of a base station device of a cellular network. For example the channel request can be a reverse registration channel request. Additionally, the antenna component 108 can facilitate the channel registration request of the mobile device 100. In response to the channel request submitted by the mobile device 100, the base station device of the cellular network can allow the mobile device 100 to register to use the requested channel. Conversely, the channel request can be declined by the base station device.

It should be noted that the channel for which the request pertains to can be a restricted channel whereby the mobile device 100 can be restricted to certain functions over the channel (e.g. receiving pages, acknowledging pages, and sending small texts in response to pages). The mobile device 100 can also comprise a display component 104 for displaying text and data associated with an incoming/outgoing call, text data, IP address data, etc. The mobile device 100 can also comprise a memory component 106 for storing data associated with incoming/outgoing voice/message data and information associated with the microcellular network and base station devices. For instance, the memory component 106 can store IP addresses of previously connected Wi-Fi devices, channel registrations for previously registered base station devices, location data, time spent on respective Wi-Fi devices, pre-populated text messages for use if the mobile device 100 is not connected to a Wi-Fi device, etc.

Figure 2:
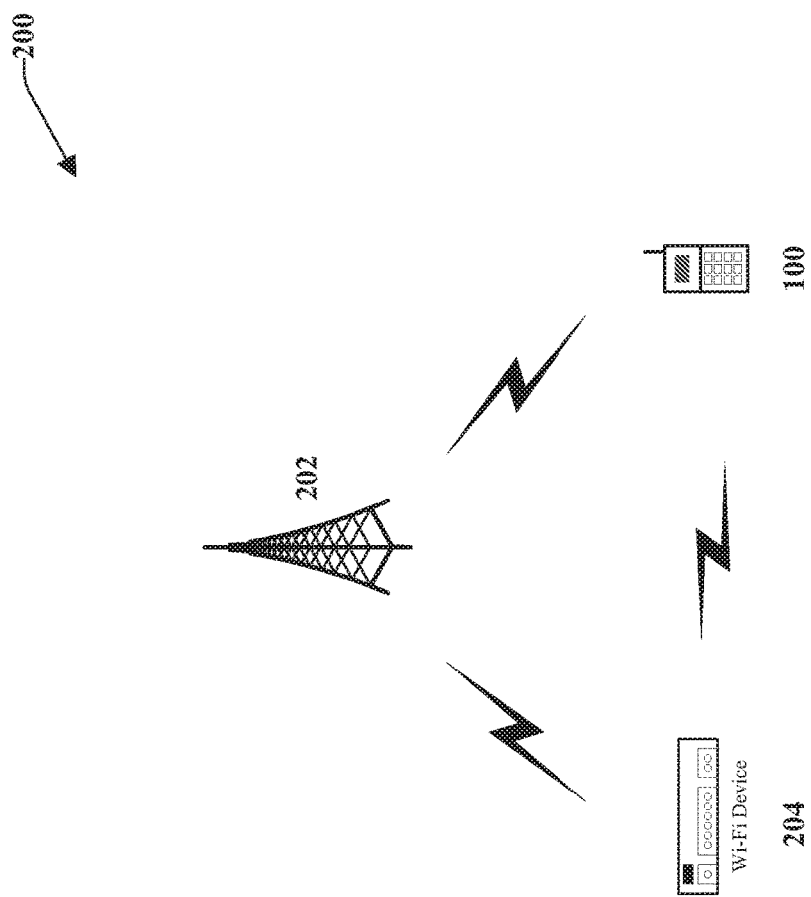
FIG. 2 illustrates example network devices communicating to facilitate microcellular service according to one or more embodiments.

Referring now to FIG. 2, illustrated are example network devices communicating to facilitate microcellular service in accordance with the embodiments herein. A microcellular network 200 can comprise a base station device 202, a mobile device 100, and a Wi-Fi device 204. Upon entering a service area associated with the base station device 202, the mobile device 100 can register with a radio channel associated with the base station device 202. Registration with the base station device 202 can be for the limited purpose of the base station device 202 locating the mobile device 100 and/or for the purpose of limited communication with the mobile device 100. For example, the limited communication can comprise a page, a missed called notification, etc.

The Wi-Fi device 204 can also be connected to the base station device 202. Upon registering with a channel of the base station device 202, the mobile device 100 can provide an IP address of the Wi-Fi device 204 to a location register associated with the base station device 202. This can alert the base station device 202 that the mobile device 100 is in communication with the Wi-Fi device 204. Consequently, the mobile device 100 can send/receive voice calls and/or data via the Wi-Fi device 204 as opposed to the cellular network. However, when the mobile device 100 is no longer able to communicate with the Wi-Fi device 204 (e.g. out of communication range), the mobile device 100 cannot send/receive real-time (or substantially real-time) voice calls and/or data via the cellular network. At most, the mobile device 100 can send predefined and/or pre-stored messages via the cellular network. Alternatively, the predefined and/or pre-stored messages can be automatically sent by the network in response to a missed communication.

Figure 3:
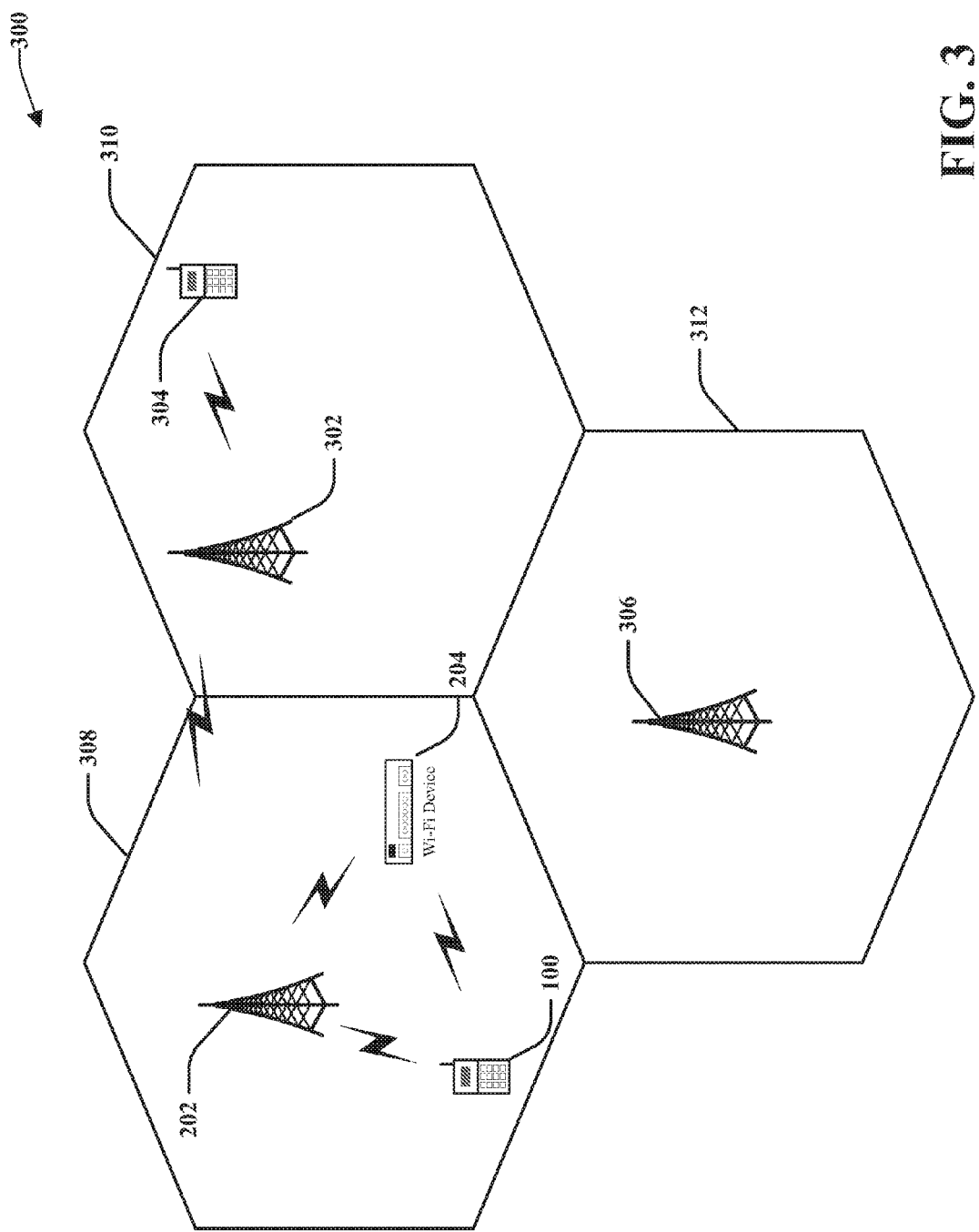
FIG. 3 illustrates an example microcellular network comprising mobile device communication based on the mobile device's relative location to a Wi-Fi device according to one or more embodiments.

Referring now to FIG. 3, illustrated is a microcellular network comprising mobile device communication based on the mobile device's relative location to a Wi-Fi device in accordance with the embodiments herein. A microcellular network 300 can comprise base station devices 202, 302, 306, mobile devices 100, 304, and a Wi-Fi device 204. Upon entering a service area associated with the base station device 202, the mobile device 100 can register with a radio channel associated with the base station device 202. Registration with the base station device 202 can be for the limited purpose of the base station device 202 locating the mobile device 100 and/or for the purpose of limited communication with the mobile device 100. For example, the limited communication can comprise a page, a missed called notification, a missed text notification, etc.

The Wi-Fi device 204 can also be connected to the base station device 202. Upon registering with a channel of the base station device 202, the mobile device 100 can provide an IP address of the Wi-Fi device 204 to a location register device associated with the base station device 202. This can alert the base station device 202 that the mobile device 100 is in communication with the Wi-Fi device 204. Consequently, the mobile device 100 can send/receive voice calls and/or data via the Wi-Fi device 204 to/from the mobile device 304, as opposed to sending/receiving voice calls and/or data via cellular network. However, when the mobile device 100 is no longer able to communicate with the Wi-Fi device 204 (e.g. outside of communication range 308), the mobile device 100 cannot send/receive real-time (or substantially real-time) voice calls and/or data via the cellular network. For instance, if the mobile device 100 moved into communication range 312 of the base station device 306, the mobile device 100 would no longer be able to send/receive voice calls and/or data over the cellular network via the base station device 306 because the mobile device 100 is not connected to a Wi-Fi device associated with the base station device 306. At most, the mobile device 100 can send predefined and/or pre-stored messages via the base station device 202 in response to an incoming call/text after the mobile device 100 has moved outside of the communication range 308. Conversely, the mobile device 304 can send/receive voice and/or text data whether it is in a communication range 310 associated with the base station device 302 or whether it is in the communication range 312 associated with the base station device 306.

Figure 4:
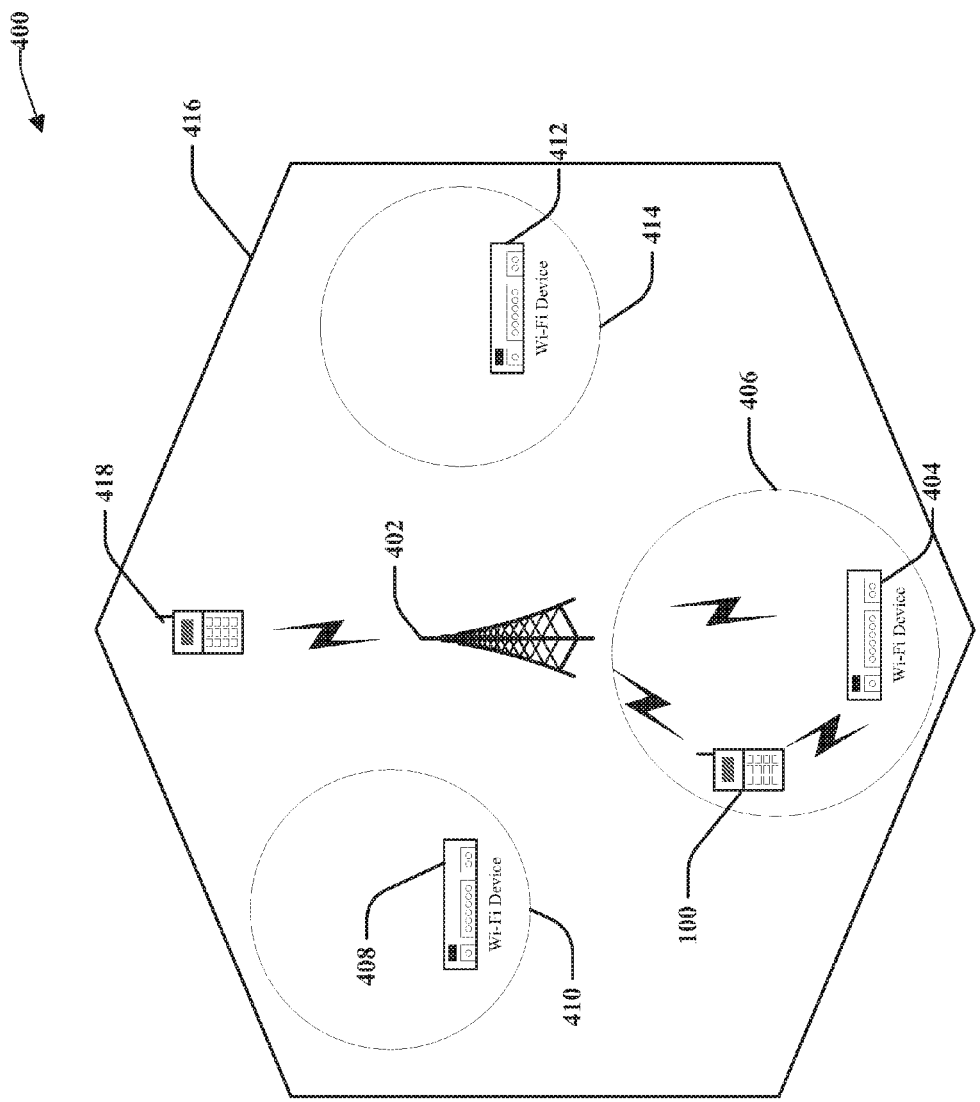
FIG. 4 illustrates an example microcellular network comprising a first mobile device in communication with a second mobile device based on the first mobile device's location in relation to a Wi-Fi device according to one or more embodiments.

Referring now to FIG. 4, illustrated is a microcellular network comprising a first mobile device in communication with a second mobile device based on the first mobile device's location in relation to a Wi-Fi device in accordance with the embodiments herein. A microcellular network 400 can comprise a base station device 402, a mobile device 100, and a Wi-Fi device 404. Upon entering a service area 416 associated with the base station device 402, the mobile device 100 can register with a radio channel associated with the base station device 402. Registration with the base station device 402 can be for the limited purpose of the base station device 402 locating the mobile device 100 and/or for the purpose of limited communication with the mobile device 100. For example, the limited communication can comprise a page, a missed called notification, a missed text, etc.

The Wi-Fi device 404 can also be connected to the base station device 402. Upon registering with a channel of the base station device 402, the mobile device 100 can provide an IP address of the Wi-Fi device 404 to a location register associated with the base station device 402. This can alert the base station device 402 that the mobile device 100 is in communication with the Wi-Fi device 404. Consequently, the mobile device 100 can send/receive voice calls and/or data via the Wi-Fi device 404 as opposed to the cellular network. However, when the mobile device 100 is no longer able to communicate with the Wi-Fi device 404 (e.g. out of communication range 406), the mobile device 100 cannot send/receive real-time (or substantially real-time) voice calls and/or data via the cellular network. At most, the mobile device 100 can send predefined and/or pre-stored messages via the cellular network.

For instance, the mobile device 100 can send/receive voice and/or text data to/from a mobile device 418 while the mobile device 100 is within the communication range 406 of the Wi-Fi device 404. It should be noted that the mobile device 418 can be connected to the base station device 402 or any other base station device of the cellular network. However, if the mobile device 100 leaves the communication range 406, the mobile device will longer be able to send/receive voice and/or text data to/from the mobile device 418 via the Wi-Fi device 404. Alternatively, should the mobile device 100 enter into the communication range 410 or the communication range 414, then the mobile device 100 can once again communicate with the mobile device 418 via the Wi-Fi devices 408, 412, respectively.

Figure 5:
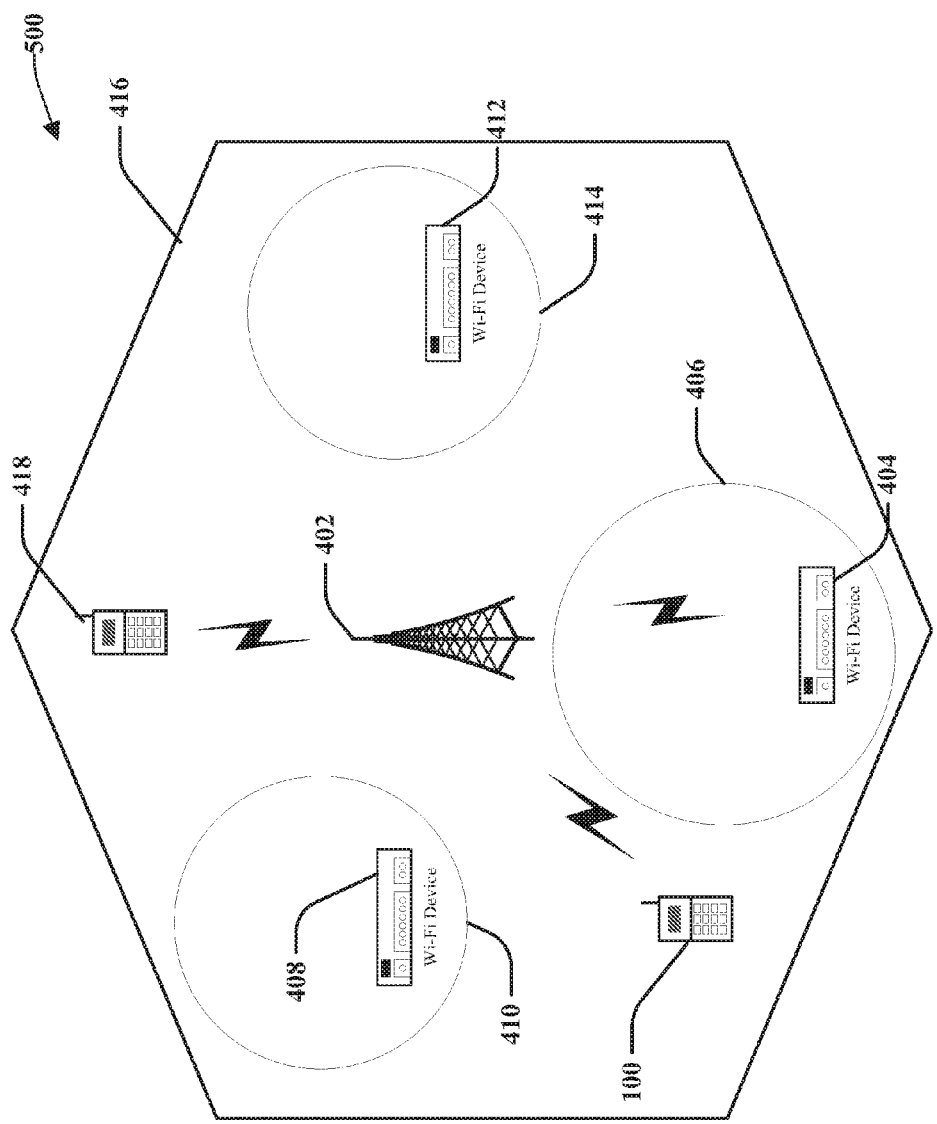
FIG. 5 illustrates an example microcellular network comprising a first mobile device in communication with a second mobile device based on the first mobile device's location in relation to a Wi-Fi device according to one or more embodiments.

Referring now to FIG. 5, illustrated is a microcellular network comprising a first mobile device in communication with a second mobile device based on the first mobile device's location in relation to a Wi-Fi device in accordance with the embodiments herein. A microcellular network 500 can comprise a base station device 402, a mobile device 100, and a Wi-Fi device 404. Although FIG. 5 depicts the mobile device outside of a communication range 406, 410, 414, the mobile device 100 can enter any of the communication ranges 406, 410, 414 within service area 416 associated with the base station device 402. It should be understood that the mobile device 100 can register with a radio channel associated with the base station device 402 in response to entering a service area 416 and/or in response to entering any communication range 406, 410, 414 within the service area 416. Registration with the base station device 402 can be for the limited purpose of the base station device 402 locating the mobile device 100 and/or for the purpose of limited communication with the mobile device 100. For example, although the mobile device cannot send/receive voice/text data via the cellular network, the base station device 402 can locate the mobile device 100 as being within the service area 416 because the mobile device 100 has registered with a channel of the base station device 402.

Consequently, the mobile device 100 can be restricted to limited communication over the cellular network, such as: a page, a missed called notification, a missed text, etc. Furthermore, the restricted communication can be contingent upon the mobile device 100 receiving an indication that another mobile device 418 has attempted communication with the mobile device 100 while the mobile device 100 is out of the communication range 406, 410, 414. For example, the mobile device 418 calls the mobile device 100, but the mobile device 100 is not in the communication range 406, 410, 414, of any Wi-Fi device 404, 408, 412. Consequently, the base station device 402 can send a predetermined message to the mobile device 418. The content of the predetermined message can depend on a predetermined association of an identification of the mobile device 418 (e.g. dad's mobile device, co-workers mobile device, friend's mobile device). Alternatively, the under the limited communication, the mobile device 100 user can be prompted to send, via the base station device 402, a predetermined text to the mobile device 418 in response to an indication that the mobile device 418 is attempting communication with the mobile device 100.

The Wi-Fi device 404 can also be connected to the base station device 402. However, upon registering with a channel of the base station device 402, the mobile device 100 cannot provide an IP address of the Wi-Fi device 404 to a location register associated with the base station device 402 because the mobile device 100 is not within the communication range 406. Since the mobile device 100 is not able to communicate with the Wi-Fi device 404 (e.g. out of communication range 406), the mobile device 100 cannot send/receive real-time (or substantially real-time) voice calls and/or data via the cellular network. At most, the mobile device 100 can send predefined and/or pre-stored messages via the cellular network as described above. For purposes of this example, it should be noted that the mobile device 418 can be connected to the base station device 402 or any other base station device of the cellular network, wherein the mobile device 418 is outside of the service area 416 associated with the base station 402.

Figure 6:
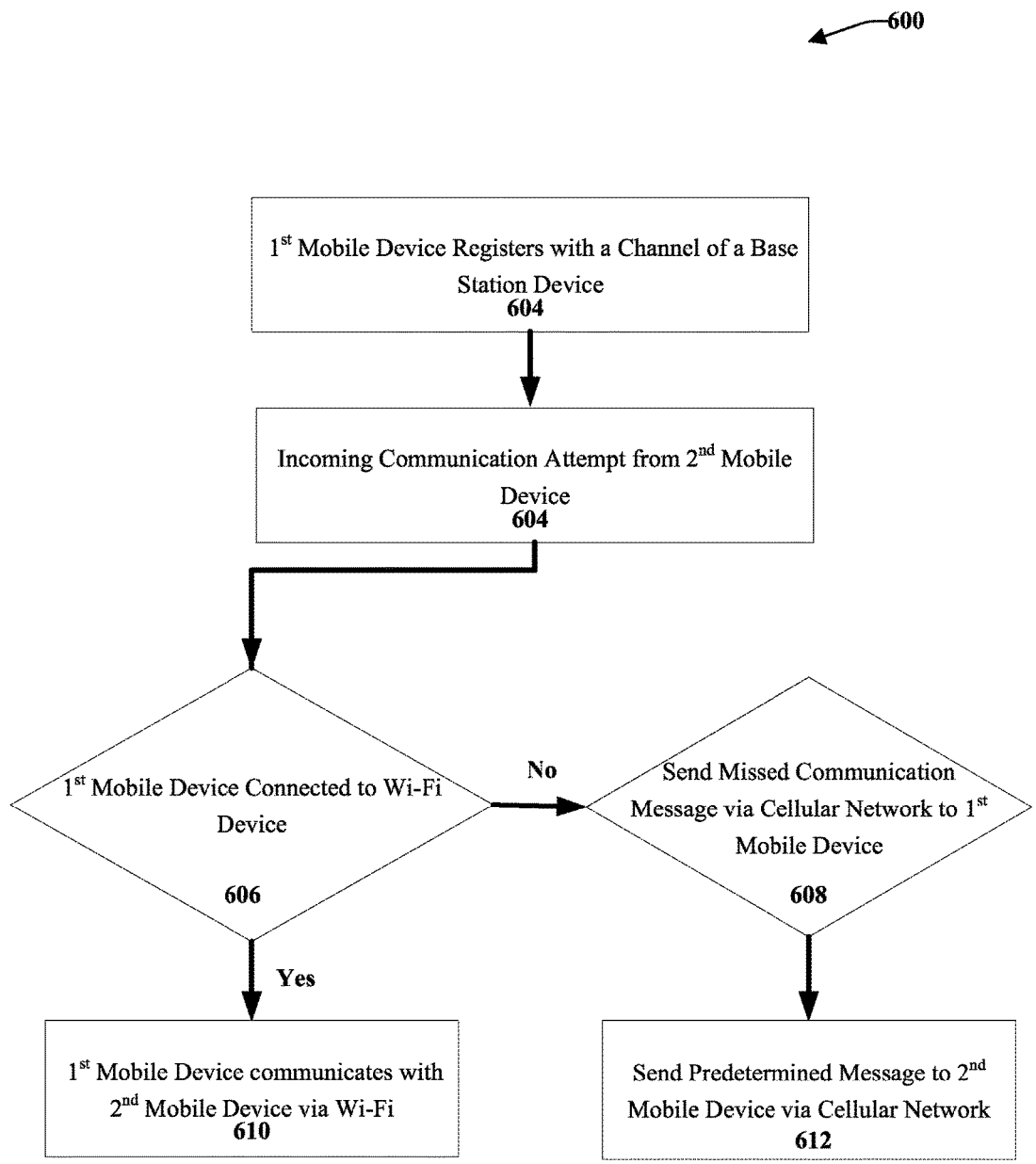
FIG. 6 illustrates an example flow diagram for performing operations associated with facilitating a microcellular network according to one or more embodiments.

Referring now to FIG. 6, illustrated is a flow diagram 600 for performing operations associated with facilitating a microcellular network in accordance with the embodiments herein. In one it embodiment, a first mobile device can register with a channel of a base station device at element 602. The first mobile device can receive an incoming communication attempt from a second mobile device at element 604. If the first mobile device is connected to a Wi-Fi device, at element 606, then the first mobile device can communicate with the second mobile device via Wi-Fi at element 610. However, if the first mobile device is not connected to the Wi-Fi device at element 606, then a missed communication message can be sent (e.g. "a user of the second mobile device has attempted to contact you"), via the cellular network, to the first mobile device at element 608. It should be understood, that another missed communication message can also be sent to the second mobile device, at element 612, to alert a user of the second mobile device that the user of the first mobile device is currently unavailable (e.g. "the mobile device user you are attempting to contact is currently unavailable, however they have received an indication of your attempt to contact them and will respond when convenient").

Figure 7:
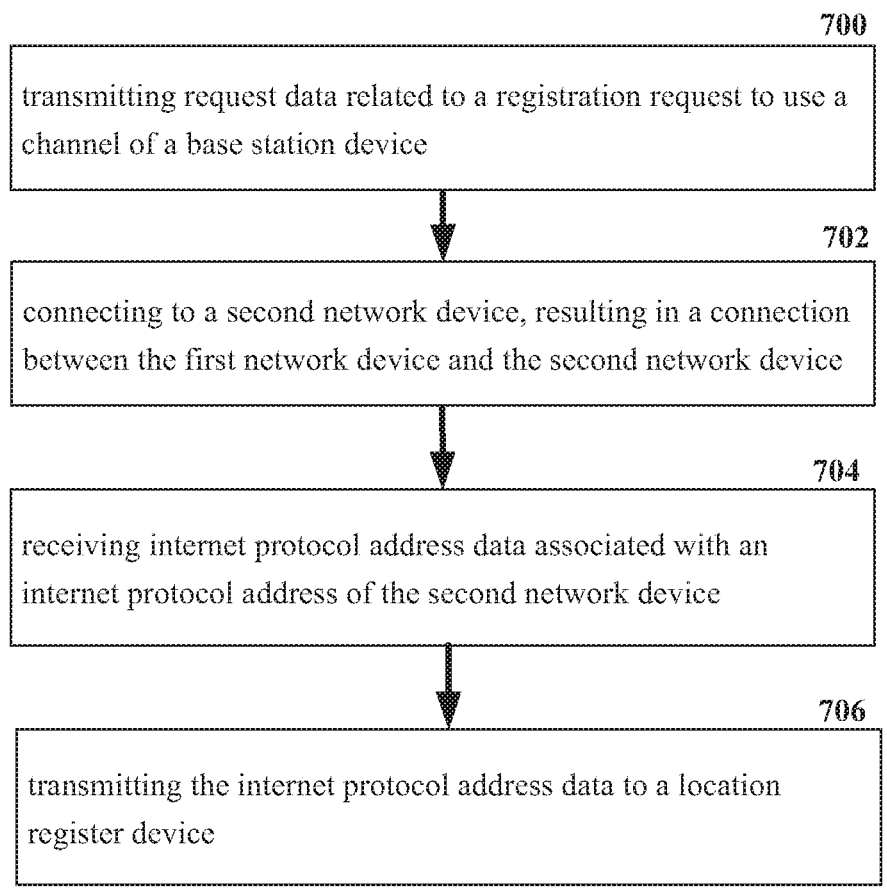
FIG. 7 illustrates an example block diagram of a method associated with facilitating a microcellular network according to one or more embodiments.

Referring now to FIG. 7, illustrated is a block diagram of a method associated facilitating a microcellular network in accordance with the embodiments herein. At element 702, a first network device can transmit request data related to a registration request to use a channel of a base station device. The registration request can be a reverse registration request for the first mobile device to communicate with the base station device. Additionally, at element 702, the first network device can connect to second network device, resulting in a connection between the first network device and the second network device. For example, a mobile device within range of a Wi-Fi device can connect to the Wi-Fi device. In response to the first network device connecting to the second network device, the first network device can receive internet protocol address data associated with an internet protocol address of the second network device at element 704. Consequently the mobile device can receive and know the internet protocol address of the Wi-Fi device that it connected to, and then transmit the internet protocol address data to a location register at element 706. The location register can be associated with the base station device, thereby allowing the base station device know where the mobile device is and that the mobile device is connected to the Wi-Fi device.

Figure 8:
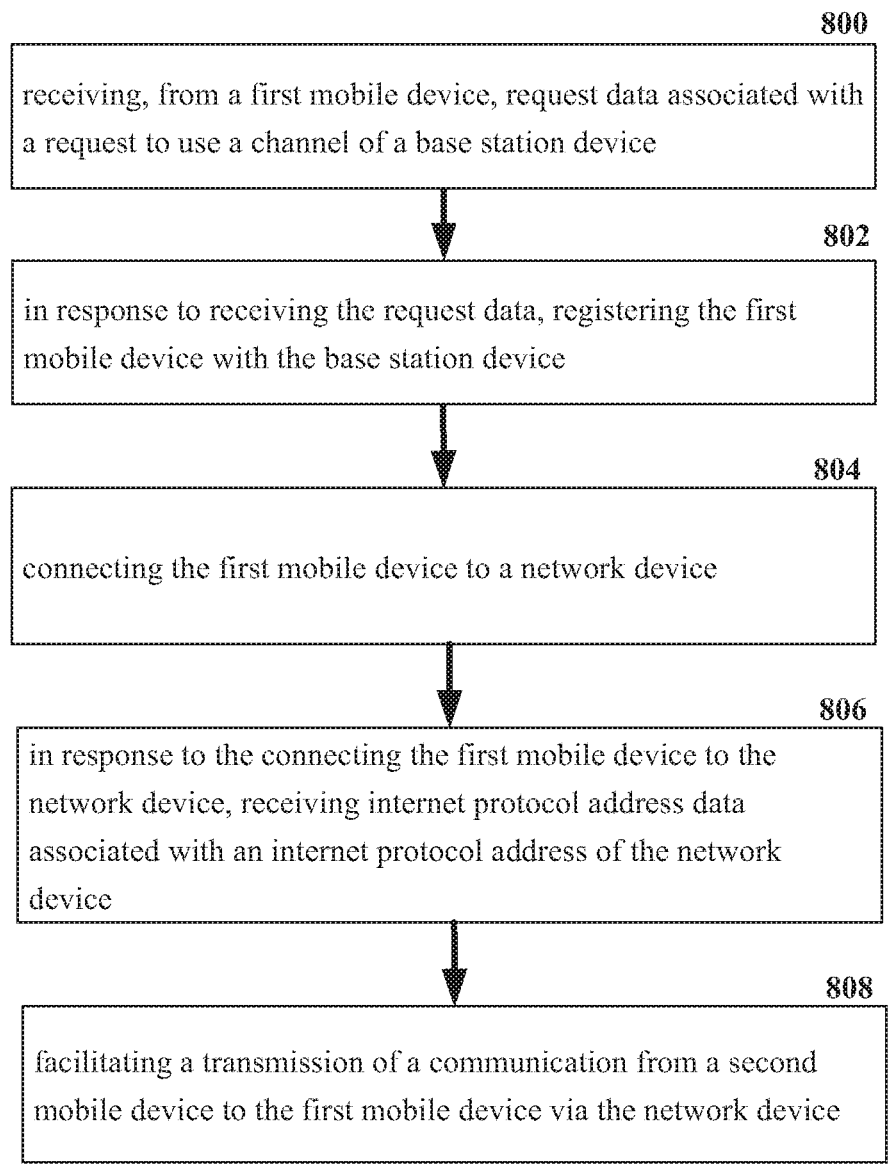
FIG. 8 illustrates an example block diagram of a system for facilitating a microcellular network according to one or more embodiments.

Referring now to FIG. 8, illustrated is a block diagram of a system for facilitating a microcellular network in accordance with the embodiments herein. At element 800, a first mobile device can receive request data associated with a request to use a channel of a base station device. The requested channel can be restricted channel, which can only allow certain types of communication (e.g. pages, limited text data, location data, etc.). In response to the system receiving the request data, the first mobile device can register with the base station device at element 802. Registering with the base station device can allow the base station device to know where the first mobile device is in relation to a service area associated with the base station device. The first mobile device can then connect to a network device at element 804, wherein the network device is within the service area associated with the base station device. It should be noted that the first mobile device can register with the base station device or connect to the network device in any order. Consequently, in response to the connecting the first mobile device to the network device, the system can receive internet protocol address data associated with an internet protocol address of the network device at element 804. The internet protocol address data can allow the system to know which Wi-Fi device the first mobile device is connected to thereby providing general location data associated with the first mobile device. Thereafter, transmission of a communication from a second mobile device to the first mobile, via the network device, can be facilitated at element 806.

Figure 9:
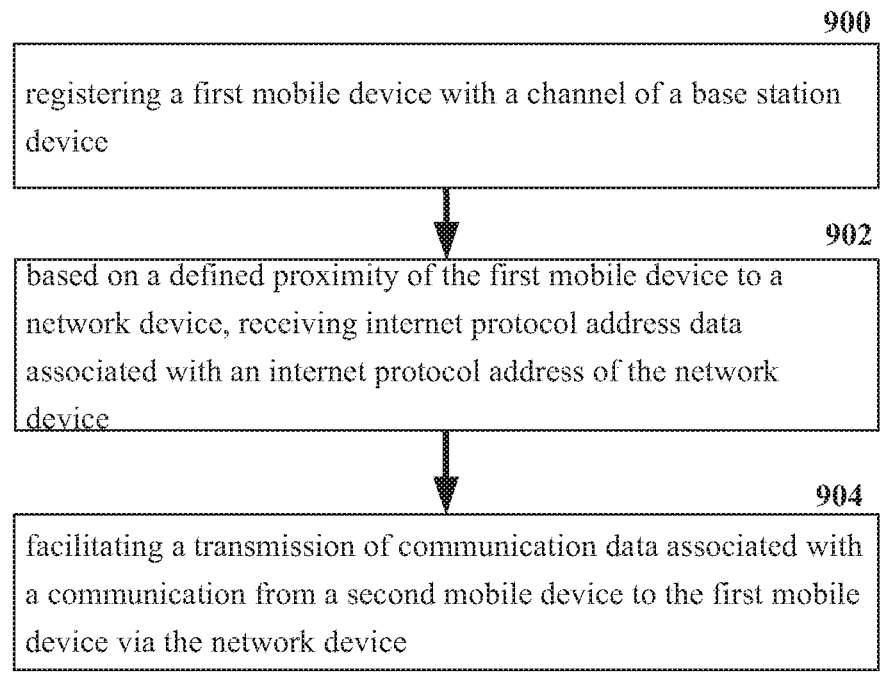
FIG. 9 illustrates an example block diagram of a machine-readable medium for facilitating a microcellular network according to one or more embodiments.

Referring now to FIG. 9, illustrated is a block diagram of a machine-readable medium for facilitating a microcellular network in accordance with the embodiments herein. At element 900, a machine-readable medium can register a first mobile device with a channel of a base station device. The channel of the base station device can allow for restricted communication between the first mobile device and the base station device. Based on a defined proximity of the first mobile device to a network device, the machine-readable medium can receive internet protocol address data associated with an internet protocol address of the network device at element 902. The internet protocol data can provide the base station device with information regarding where the first mobile device is located and what Wi-Fi device the first mobile device is communicating with. Furthermore, the machine-readable medium can facilitate transmission of communication data associated with a communication from a second mobile device to the first mobile device via the network device at element 904. Essentially, when the first mobile device is in communication with the Wi-Fi device, the first mobile device can send/receive data/voice messages to/from a second mobile device. However, upon disconnecting with the Wi-Fi device, the first mobile device can have restricted capabilities until it is yet again in the presence of the Wi-Fi device or another Wi-Fi device.

Figure 10:
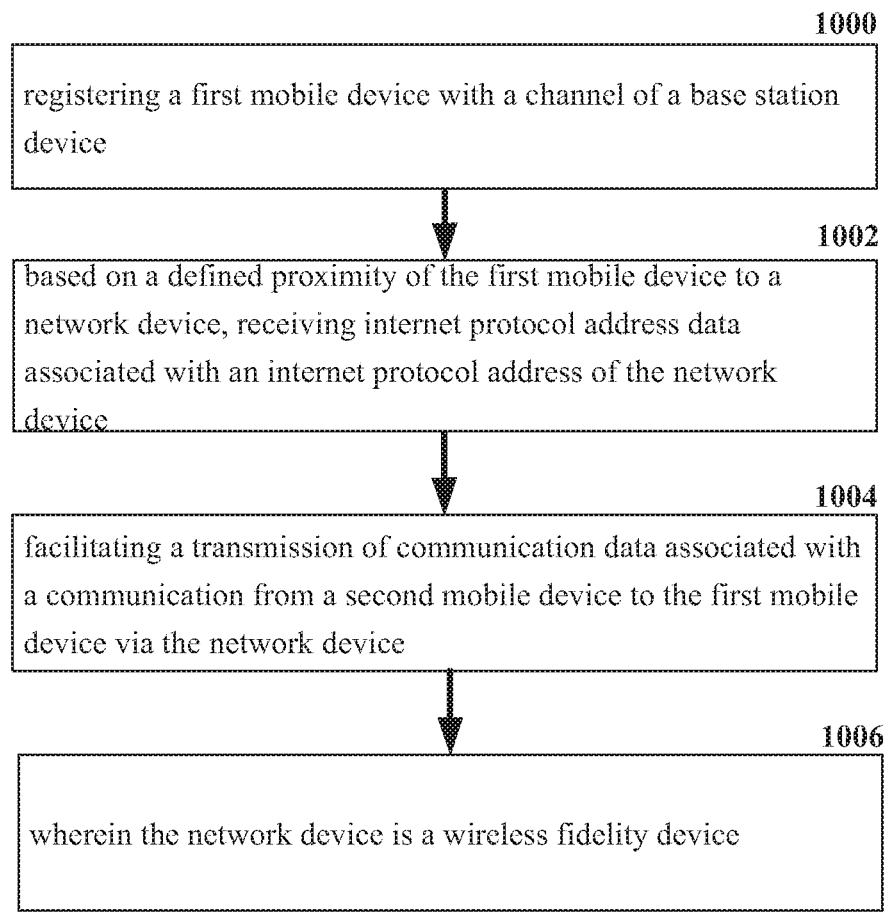
FIG. 10 illustrates another example block diagram of a machine-readable medium for facilitating a microcellular network according to one or more embodiments.

Referring now to FIG. 10, illustrated is another block diagram of a machine-readable medium for facilitating a microcellular network in accordance with the embodiments herein. At element 1000, a machine-readable medium can register a first mobile device with a channel of a base station device. The channel of the base station device can allow for restricted communication between the first mobile device and the base station device. Based on a defined proximity of the first mobile device to a network device, the machine-readable medium can receive internet protocol address data associated with an internet protocol address of the network device at element 1002. The internet protocol data can provide the base station device with information regarding where the first mobile device is located and what network device the first mobile device is communicating with. Furthermore, the machine-readable medium can facilitate transmission of communication data associated with a communication from a second mobile device to the first mobile device via the network device at element 1004. Essentially, when the first mobile device is in communication with the network device, the first mobile device can send/receive data/voice messages to/from a second mobile device. However, upon disconnecting with the network device, the first mobile device can have restricted capabilities until it is yet again in the presence of the network device or another network device. Additionally, at element 1006, the network device can be a Wi-Fi device. The base station device can ascertain where the mobile device is located by determining whether the mobile device is registered to use a channel associated with the first mobile device and furthermore by determining if the first mobile device has sent internet protocol data to the base station device associated with a Wi-Fi device that the first mobile device is in communication with.

Figure 11:
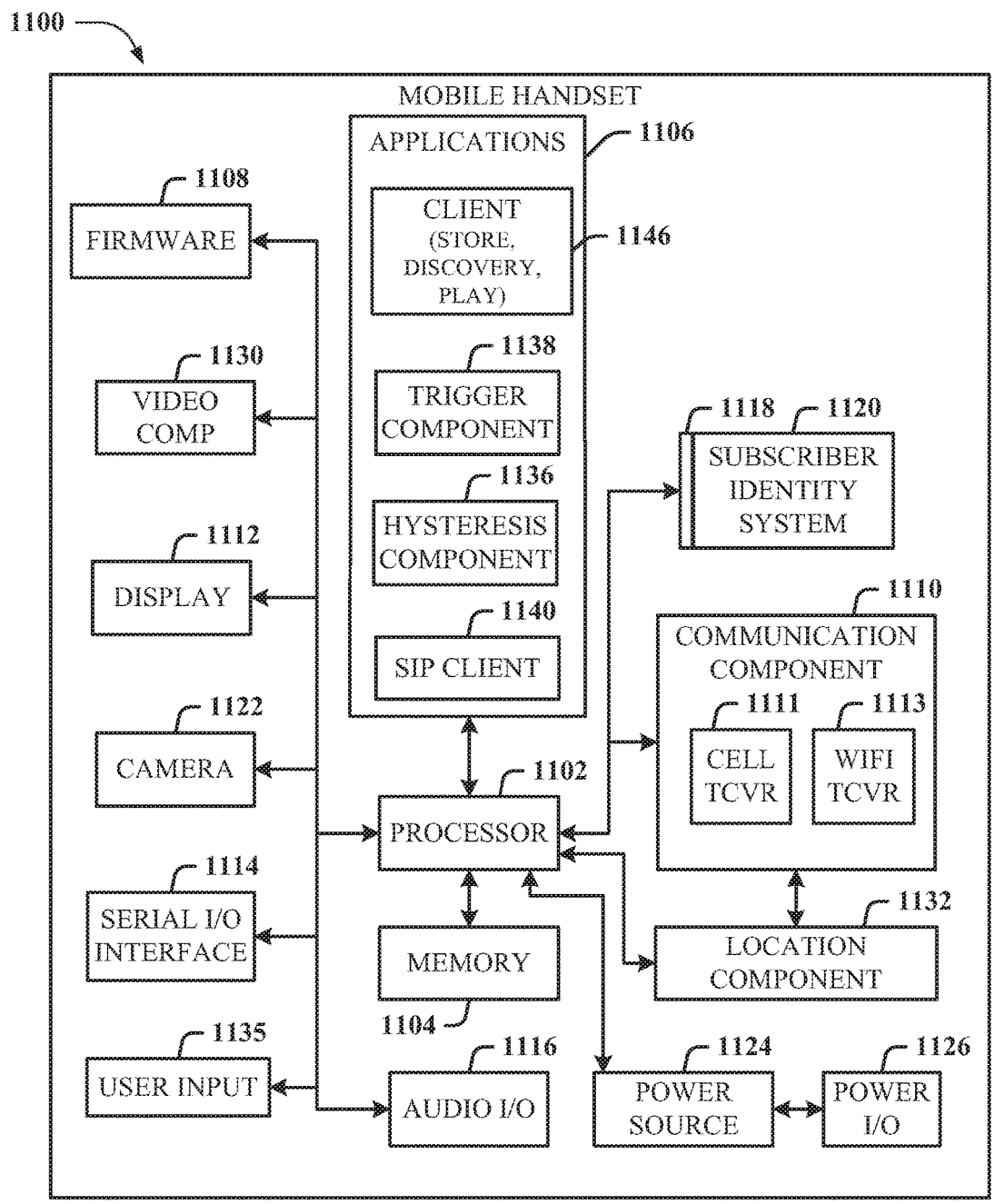
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
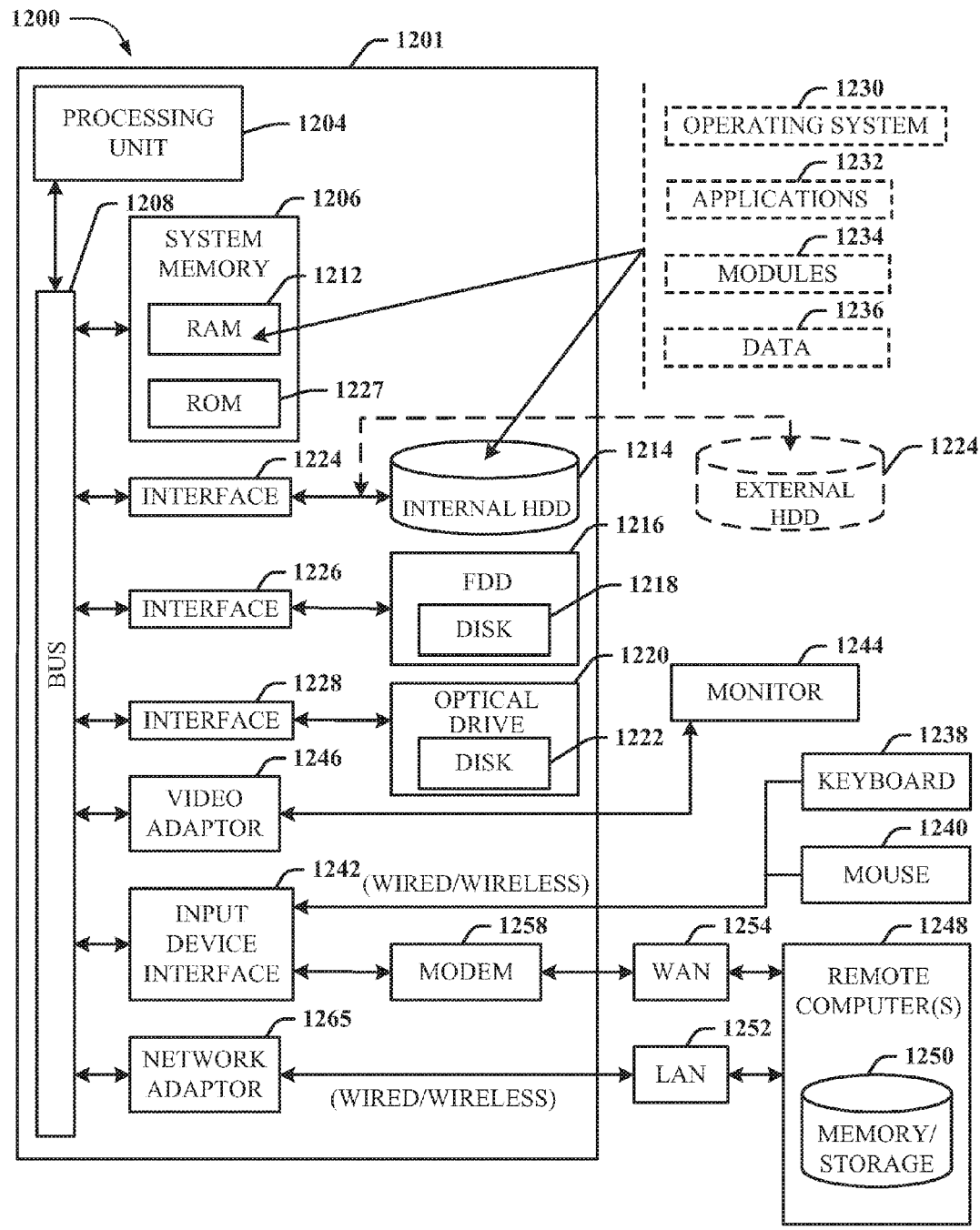
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

facilitating, by a first network device comprising a processor, transmitting request data related to a registration request to use a channel of a base station device;

facilitating, by the first network device, connecting to a second network device, resulting in a connection between the first network device and the second network device;

facilitating, by the first network device, receiving internet protocol address data associated with an internet protocol address of the second network device;

facilitating, by the first network device, transmitting the internet protocol address data to a location register;

in response to a condition associated with a distance between the first network device and the second network device being determined to have been satisfied, terminating, by the first network device, the connection;

in response to a third network device attempting a communication with the first network device, facilitating, by the first network device, receiving an indication of a missed communication from the third network device via the channel of the base station device; and in response to the receiving the indication of the missed communication, facilitating, by the first network device, transmitting predefined message data associated with a predefined message to the third network device via the base station device.

2. The method of claim 1, wherein the location register is associated with the base station device.

3. The method of claim 1, further comprising:
downloading, by the first network device, location data associated with a location of a fourth network device.

4. The method of claim 1, further comprising:
in response to the receiving the indication of the missed communication, prompting, by the first network device, the base station device to send the predefined message to the third network device.

5. The method of claim 4, wherein the predefined message comprises message data representative of the missed communication between the first network device and the third network device.

6. The method of claim 1, further comprising:
in response to the receiving the indication of the missed communication, facilitating, by the first network device, transmitting acknowledgement data representative of an acknowledgement of the missed communication to be sent to the third network device.

7. The method of claim 6, wherein the acknowledgement data representative of the acknowledgment of the missed communication is sent to the third network device via a reverse access channel different from the channel.

8. A system, comprising:
a processor; and
a memory that stores executable instructions that, when executed by the processor, facilitate performance of operations, comprising:
receiving, from a first mobile device, request data associated with a request to use a channel of a base station device;
in response to the receiving the request data, facilitating a registration of the first mobile device with the base station device;
connecting the first mobile device to a network device;
in response to the connecting the first mobile device to the network device, receiving internet protocol address data associated with an internet protocol address of the network device;
sending a first communication from a second mobile device to the first mobile device via the network device;
based on a condition associated with a distance between the first mobile device and the network device being determined to have been satisfied, terminating the sending of the first communication between the second mobile device and the first mobile device;
in response to a third mobile device attempting a second communication with the first mobile device, sending an indication of a missed communication, from the third mobile device, via the channel of the base station device; and
in response to the sending the indication of the missed communication, sending predefined message data associated with a predefined message to the third mobile device via the base station device.

9. The system of claim 8, wherein the network device is a first network device, and wherein the operations further comprise:
based on a proximity of a second network device to the first network device, generating location data associated with a location of the second network device.

10. The system of claim 9, wherein the operations further comprise:
displaying, via a display of the first mobile device, the location of the second network device.

11. The system of claim 10, wherein the operations further comprise:
facilitating a download of the location data to the first mobile device.

12. The system of claim 11, wherein the second network device is available for communication with the first mobile device based on agreement data representative of a service provider agreement.

13. The system of claim 9, wherein the indication is a first indication, and wherein the operations further comprise:
displaying, via a display of the first mobile device, a second indication, based on a third communication of the first mobile device with the second network device, that the second network device is available for a fourth communication.

14. The system of claim 9, wherein the indication is a first indication, and wherein the operations further comprise:
displaying, via a display of the first mobile device, a second indication, based on a time of day, that the second network device is available for a third communication.

15. A non-transitory machine-readable storage medium, comprising executable instructions that, when executed by a processor, facilitate performance of operations, comprising:
determining a first mobile device has been registered with a channel of a base station device;
based on a defined proximity of the first mobile device to a network device, receiving internet protocol address data associated with an internet protocol address of the network device;
transmitting communication data associated with a first communication attempt from a second mobile device to the first mobile device via the network device;
in response to a condition associated with a distance between the first mobile device and the network device being determined to have been satisfied, terminating the transmitting of the communication data between the second mobile device and the first mobile device;

in response to a second communication attempt from a third mobile device to the first mobile device, transmitting an indication of a missed communication, from the third mobile device, via the channel of the base station device; and in response to the transmitting the indication of the missed communication, transmitting predefined message data representative of a predefined message to the third mobile device via the base station device.

16. The non-transitory machine-readable storage medium of claim 15, wherein the network device is a wireless fidelity device.

17. The non-transitory machine-readable storage medium of claim 15, wherein the communication data comprises voice data and text data.

18. The non-transitory machine-readable storage medium of claim 15, wherein the indication is a first indication, and wherein the operations further comprise:

receiving a second indication that the first mobile device is no longer in the defined proximity of the network device.

19. The non-transitory machine-readable storage medium of claim 15, wherein the indication is a first indication, wherein the defined proximity is a first defined proximity, and wherein the operations further comprise:

based on a second indication that the first mobile device is no longer communicating with the network device and that the first mobile device is in a second defined proximity of the base station device, generating location data associated with the first mobile device in relation to the base station device.

20. The non-transitory machine-readable storage medium of claim 19, wherein the operations further comprise:

sending the location data associated with the first mobile device to the second mobile device.

* * * * *